(12) United States Patent
Keshtkarjahromi et al.

(10) Patent No.: US 12,189,831 B2
(45) Date of Patent: *Jan. 7, 2025

(54) CARTRIDGE DATA STORAGE WITH INFORMATION-THEORETIC SECURITY

(71) Applicant: Seagate Technology LLC, Fremont, CA (US)

(72) Inventors: Yasaman Keshtkarjahromi, Shakopee, MN (US); Riyan Alex Mendonsa, Minneapolis, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 628 days.

This patent is subject to a terminal disclaimer.

(21) Appl. No.: 17/077,875

(22) Filed: Oct. 22, 2020

(65) Prior Publication Data

US 2022/0129592 A1    Apr. 28, 2022

(51) Int. Cl.
| | | |
|---|---|---|
| *G06F 21/60* | (2013.01) | |
| *G06F 3/06* | (2006.01) | |
| *G06F 21/62* | (2013.01) | |
| *G06F 21/72* | (2013.01) | |
| *G06F 21/78* | (2013.01) | |
| *H04L 9/14* | (2006.01) | |
| *G06F 21/10* | (2013.01) | |
| *G06F 21/71* | (2013.01) | |

(52) U.S. Cl.
CPC ............ *G06F 21/78* (2013.01); *G06F 3/0622* (2013.01); *G06F 3/0644* (2013.01); *G06F 3/0683* (2013.01); *G06F 21/602* (2013.01); *G06F 21/6218* (2013.01); *G06F 21/107* (2023.08)

(58) Field of Classification Search
None
See application file for complete search history.

(56) References Cited

U.S. PATENT DOCUMENTS

| | | |
|---|---|---|
| 7,493,494 B2 | 2/2009 | Bondurant |
| 9,588,705 B2 | 3/2017 | Carlson et al. |
| 10,776,010 B1 | 9/2020 | Mendonsa et al. |

(Continued)

FOREIGN PATENT DOCUMENTS

WO    2008028766 A1    3/2008

OTHER PUBLICATIONS

BSS: block-based sharing scheme for secure data storage services in mobile cloud environment. Khan. Springer. (Year: 2014).*

(Continued)

*Primary Examiner* — Venkat Perungavoor
(74) *Attorney, Agent, or Firm* — HOLZER PATEL DRENNAN

(57) ABSTRACT

A secure cartridge-based storage system includes a set of read/write control electronics on a shared controller adapted to removably couple with each of a plurality of storage cartridges. Data blocks within primary non-volatile memory of the cartridge-based storage system collectively comprise a main store with information-theoretic security. The shared controller incorporates various controls for providing selective data access to individual data magazines and/or cartridges as well as for partitioning user data and writing the partitioned data according to an information-theoretic security scheme and reading the partitioned data and reconstructing the user data from the partitioned data.

18 Claims, 7 Drawing Sheets

(56) References Cited

U.S. PATENT DOCUMENTS

| | | | |
|---|---|---|---|
| 2005/0091443 A1* | 4/2005 | Hershkovich | G06F 16/2246 711/100 |
| 2011/0243319 A1* | 10/2011 | Shirai | G09C 1/00 380/28 |
| 2013/0305057 A1* | 11/2013 | Greco | G06F 3/0652 713/189 |
| 2015/0010146 A1* | 1/2015 | Matsuda | H04L 9/0816 380/44 |
| 2015/0039904 A1* | 2/2015 | Matsuda | H04L 9/0618 713/189 |
| 2019/0179805 A1 | 6/2019 | Prahlad et al. | |
| 2021/0124832 A1* | 4/2021 | Sadjadpour | G06F 21/602 |
| 2021/0133152 A1* | 5/2021 | Keshtkarjahromi | G06F 16/278 |

OTHER PUBLICATIONS

Self-Sorting SSD: Producing Sorted Data Inside Active SSDs. Quero. IEEE. (Year: 2015).*
A MapReduceMerge-based Data Cube Construction Method. Wang. IEEE. (Year: 2010).*
PSDS-Proficient Security Over Distributed Storage: A Method for Data Transmission in Cloud. Shahid. IEEE.(Year: 2020).*
Secret Sharing. (Accessed Oct. 22, 2020). In Wikipedia. Retrieved from https://en.wikipedia.org/wiki/Secret_sharing#Blakley's_scheme.

\* cited by examiner

CARTRIDGE DATA STORAGE WITH INFORMATION-THEORETIC SECURITY

BACKGROUND

Growing use of cloud-based storage solutions has driven demand for low-cost data storage systems capable of retaining large volumes of data. In recent years, this demand has driven development of storage solutions with read/write control systems that are shared between groups of hot-swappable drives. In these systems, some or all of the read/write control electronics traditionally included within each individual drive may be displaced from the drive's enclosure to a shared control board with an interconnect that couples the read/write control electronics to several different drives. These read/write control electronics located on the shared control board may generate the read/write control signals to control data access to each of multiple drives.

Some of these systems include centralized, shared read/write controls on a shared control board (e.g., a printed circuit board assembly, or PCBA) that is designed to removably couple to individual cartridges, in some cases via a robotic arm. When the shared control board is displaced from individual storage drive enclosures to locations where they are instead shared by multiple cartridges, challenges arise relating to how to separately secure data stored on the individual cartridges. As a traditional encryption-based security system is typically implemented on a sub-chip on a control board specific to each individual storage drive, a traditional encryption-based security system implemented on a sub-chip on the shared control board would result in access to each cartridge that the shared control board has access to.

SUMMARY

Implementations described and claimed herein address the foregoing problems by providing a cartridge data storage system with information-theoretic security comprising a first cartridge storing a first encrypted data packet, a second cartridge storing a second encrypted data packet, and a shared controller providing read and write access to the first cartridge and the second cartridge. The shared controller has data partitioning circuitry including a file partitioner to divide a file into a first part and a second part, a key generator to randomly generate one or more keys, and a packet generator. The packet generator combines the first part of the file with a linear combination of one or more of the keys to generate the first encrypted data packet and the second part of the file with another linear combination of one or more of the keys to generate the second encrypted data packet.

Implementations described and claimed herein address the foregoing problems by further providing a method for data storage within a cartridge data storage system with information-theoretic security comprising dividing a file into a first part and a second part at a shared controller, generating one or more randomly-selected keys at the shared controller, combining the first part of the file with a linear combination of one or more of the keys to generate a first encrypted data packet at the shared controller, combining the second part of the file with another linear combination of one or more of the keys to generate a second encrypted data packet at the shared controller, and writing the first encrypted data packet to a first cartridge and the second encrypted data packet to a second cartridge using the shared controller.

Implementations described and claimed herein address the foregoing problems by still further providing a cartridge data storage system with information-theoretic security comprising a first magazine of cartridges storing a first grouping of encrypted data packets, a second magazine of cartridges storing a second grouping of encrypted data packets, and a shared controller providing read and write access to the cartridges within the first magazine and the second magazine. The shared controller has data partitioning circuitry including a file partitioner to divide a file into a first part and a second part, a key generator to randomly generate one or more keys, and a packet generator. The packet generator combines the first part of the file with a linear combination of one or more of the keys to generate a first encrypted data packet within the first grouping, and the second part of the file with another linear combination of one or more of the keys to generate a second encrypted data packet within the second grouping.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

Some secure data storage devices include control circuitry for encrypting user data during data write operations and/or decrypting the data during read operations. For example, a secure storage drive may prohibit read/write access until a user provides a pin (or a public key) that the storage drive has associated in local memory with an encryption key (or a private key). Responsive to successful authentication of the pin, the control circuitry accesses the encryption key for encryption/decryption during host-initiated read and write operations.

A secure storage device typically stores an encryption key somewhere other than the device's primary storage media, since the data on the primary media is itself encrypted with the key. The encryption key may, for example, be stored in non-volatile memory accessible by the device's read/write control system or within a hardware register of the read/write control system. In the example of a hard disc drive (HDD), the encryption key may be stored within the HDD's system-on-chip (SoC), which functions as the read/write control system. The SoC is traditionally located on a printed circuit board assembly (PCBA) within the HDD. In many of the systems disclosed herein, data is stored on portable storage cartridges that lack the PCBA, SoC, and independent read/write control electronics.

The term "storage cartridges" or "cartridges" is used herein to refer to an example type of portable storage drive lacking an independent set of read/write controls. By example and without limitation, the example storage cartridges described herein are shown to resemble conventional hard disc drives (HDDs), but without certain mechanical and electrical features that would otherwise be necessary to enable the storage cartridges to operate in a stand-alone fashion. Each storage cartridge may, for example, generally assume the form of an HDD minus control electronics and, in some cases, other elements that can be offloaded from the cartridge and supplied by a shared controller (or media player), such as voice-coil-motor (VCM) magnets and spindle motor components. The removal of these elements from the individual cartridges within a library allows the provisioning of a large-scale, high-capacity storage system with the benefits of magnetic disc storage at a significantly lower cost. In some implementations, the storage cartridges within the secure cartridge-based storage system may include solid state drive (SSD) media with read/write control electronics removed to the shared media player(s), in lieu of or in addition to HDD media.

Figure 1:
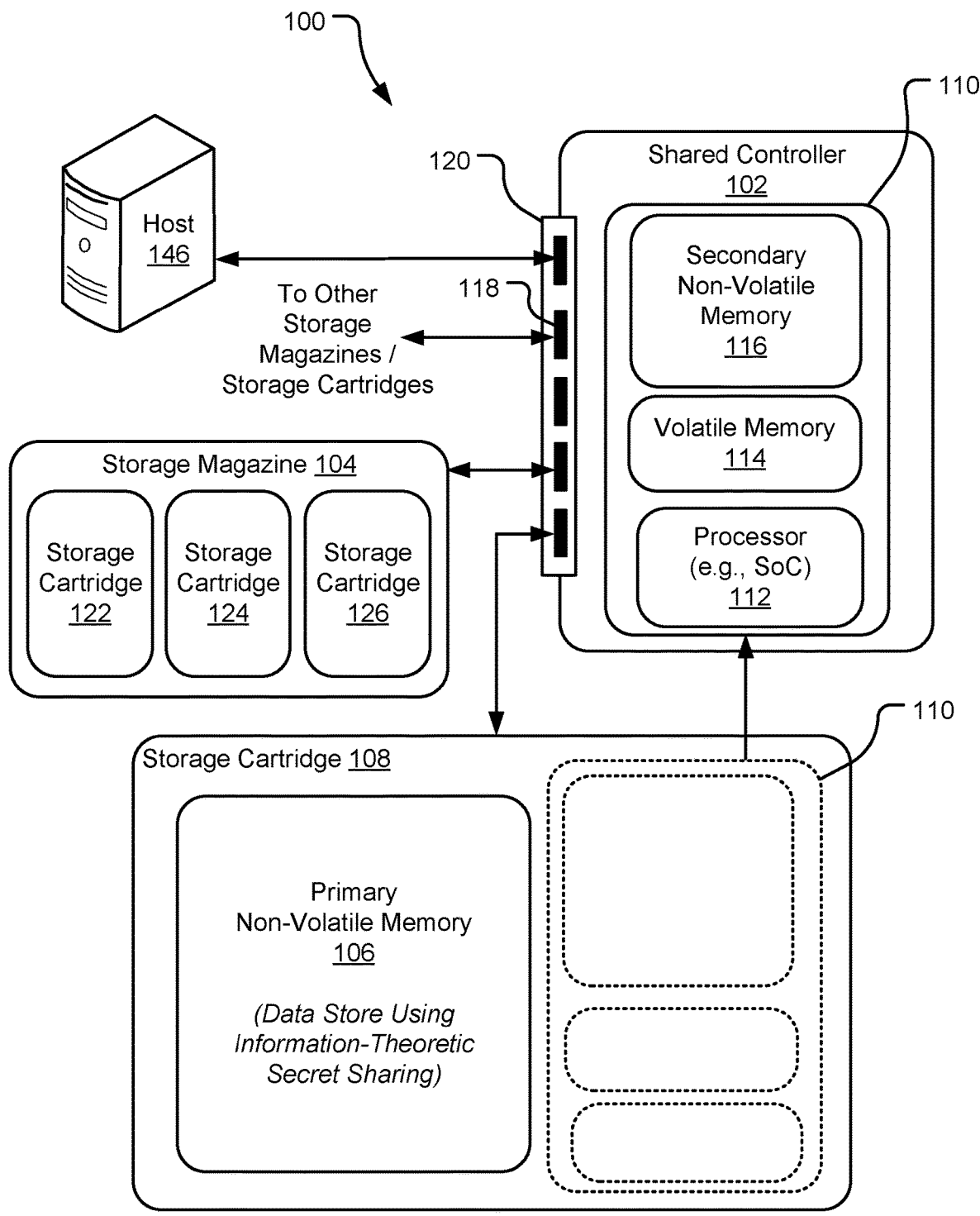
FIG. 1 illustrates an example secure cartridge-based data storage system including a storage cartridge having a primary non-volatile memory with information-theoretic security.

FIG. 1 illustrates an example secure cartridge-based data storage system 100 including a storage cartridge 108 having a primary non-volatile memory 106 with information-theoretic security. The storage cartridge 108 lacks traditional storage and processing resources for storing an encryption key used to encrypt data being written to the primary non-volatile memory 106 and to decrypt data being read from the primary non-volatile memory 106. The primary non-volatile memory 106 may include one or more types of non-volatile storage media including, for example, magnetic discs, optical drives, flash, etc. Data blocks within the primary non-volatile memory 106 collectively comprise a data store using information-theoretic secret sharing, which refers to a collection of physical data blocks stored using an information-theoretic security scheme. When combined with a minimum number of other physical data blocks stored on primary non-volatile memory of other storage cartridges, the data blocks may be mapped to a range of logical block addresses (LBAs) that may be utilized by a host device 146, when reading and writing data to the storage cartridge 108.

The storage cartridge 108 is coupled to a shared controller (or media player) 102 that includes a shared control board including read/write control electronics 110 for generating read and write signals used to access the primary non-volatile memory 106. The shared controller 102 also generates read and write signals for accessing primary non-volatile memory within other cartridges that are also coupled to the shared controller 102 through various ports (e.g., port 118) in an interconnect 120. In other implementations, the shared controller 102 is a full data storage device with its own primary non-volatile memory, but that can be used to access the primary non-volatile memory 106 or other non-volatile memory within the system 100.

In one example implementation, storage cartridges (e.g., cartridges 122, 124, 126) are connected to the shared controller 102 in the form of a storage magazine, also referred to herein as a magazine (e.g., magazine 104). More specifically, one or more cartridges fill a magazine (here, three cartridges 122, 124, 126 fill magazine 104), and one or more magazines are connected to the shared controller 102 via the interconnect 120. In various implementations, any number of cartridges may fill a magazine, and any number of magazines may be connected to the shared controller 102 within physical constraints of a housing (not shown, see e.g., rack 228 of FIG. 2) for the storage system 100. As mentioned above, a robotic system (not shown) may be used to selectively connect the magazines, or in some implementations individual cartridges, to the shared controller 102.

Although the specific read/write control electronics 110 included on the shared controller 102 may vary from one implementation to another, the read/write control electronics of FIG. 1 may include at least a processor 112, volatile memory 114 (e.g., DRAM), and a secondary non-volatile memory 116 (e.g., Flash). As indicated by dotted lines within the storage cartridge 108, the read/write control electronics 110 represent a collection of electronics traditionally included within an enclosure of the storage cartridge 108 that have, as illustrated in FIG. 1, been displaced to the shared controller 102.

In typical cryptographic secure drive technologies, data stored in the primary non-volatile memory 106 is secured using an encryption key so that the storage cartridge 108 cannot be accessed by an unauthorized user. Such an encryption key may, for example, prevent access and misappropriation of data stored on the storage cartridge 108 in the event that the storage cartridge 108 is stolen from a storage center. In the illustrated system 100, however, the storage cartridge 108 lacks both control electronics and the associated secondary non-volatile memory 116 accessed by the control electronics. Therefore, a location traditionally used to store an encryption key no longer exists within the storage cartridge 108. This gives rise to a number of practical challenges to locating the encryption key and, in cases where the stored encryption key is separated from the storage cartridge 108, identifying the appropriate stored encryption key for use in accessing data stored in the storage cartridge 108.

Information-theoretic security is a cryptosystem where security derives from information theory. An information-theoretically secure system is considered crypto-analytically unbreakable if an adversary does not have enough information to break the encryption. The various information-theoretic approaches disclosed herein do not require an encryption key to recover stored data, but rather the information itself is split amongst storage cartridges/magazines. Each piece of information (or partition of the data) does not yield any information about the data. In order to access the data, a user needs a minimum number of nodes to recover the data. Further, the data may be partitioned in random sizes, which further adds to the information-theoretic security of the data. Still further, if one of an array of storage cartridges/magazines fails, information-theoretic security provides that all the data may be recovered so long as a minimum number of the storage cartridges/magazines remain in working order. Still further, if the shared controller 102 fails, the data may be recovered after the shared controller 102 is replaced so long as a minimum number of the storage cartridges/magazines remain in working order. This stands in contrast to a failure of a shared controller in a cryptographic security approach, where if the shared controller 102 stores the encryption key, and the shared controller 102 fails, the data on the storage cartridges/magazines is unrecoverable if the encryption key is unrecoverable. The secure data storage schemes disclosed herein are based on information-theoretic security.

The herein disclosed solutions to the above-described challenges may fall into two broad categories: (1) an information-theoretic security scheme implemented across individual cartridges within a magazine connected to the shared controller 102; and (2) an information-theoretic security scheme implemented across several magazines connected to the shared controller 102. While not described in detail, similar approaches may be applied across other groupings of data storage devices (e.g., across multiple racks within a data storage facility, or across multiple data storage facilities). Example implementations are further explored below.

Aspects of the various control electronics within the shared controller 102 and/or the storage cartridge 108 may be implemented in a tangible computer-readable storage media readable by a computing node within or communicatively coupled to the data storage system 100. The term "tangible computer-readable storage media" includes, but is not limited to, random access memory ("RAM"), ROM, EEPROM, flash memory or other memory technology, CDROM, digital versatile discs (DVD) or other optical disc storage, magnetic cassettes, magnetic tape, magnetic disc storage or other magnetic storage devices, or any other tangible medium which can be used to store the desired information and which can be accessed by mobile device or computer. As used herein, the term "tangible computer-readable media" excludes transitory media such as propagating signals. In contrast to tangible computer-readable storage media, intangible computer-readable communication signals may embody computer readable instructions, data structures, program modules, or other data resident in a modulated data signal, such as a carrier wave or other signal transport mechanism.

Figure 2:
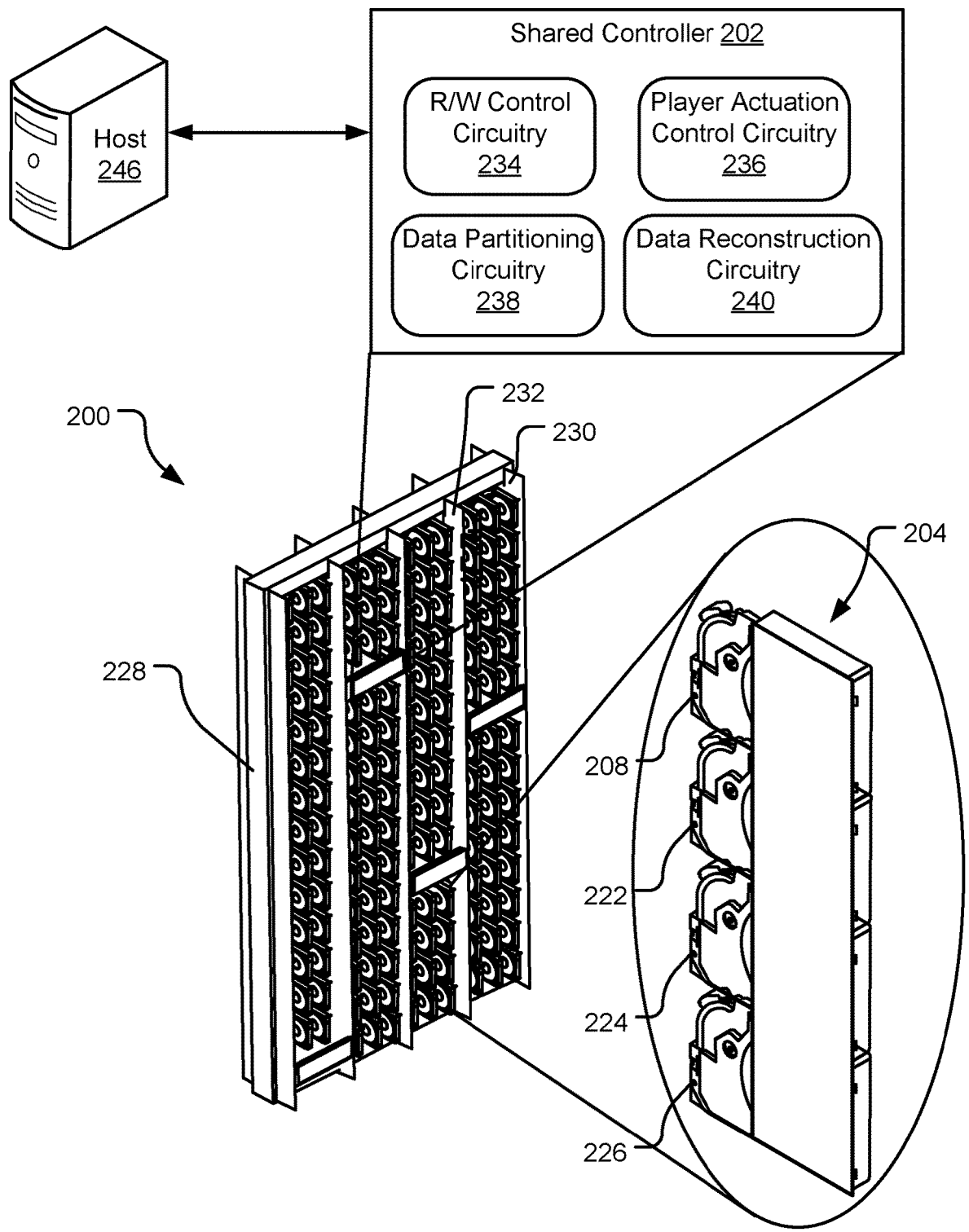
FIG. 2 illustrates an example secure cartridge-based data storage system including multiple magazines, each with multiple storage cartridges, each storage cartridge having a primary non-volatile memory with information-theoretic security.

FIG. 2 illustrates an example secure cartridge-based storage system 200 including multiple magazines (e.g., a storage magazine 204), each with multiple storage cartridges (e.g., storage cartridges 208, 222, 224, 226), each storage cartridge having a primary non-volatile memory with information-theoretic security. The magazines and storage cartridges within the storage system 200 generally lack independent read/write control electronics. A shared controller (or media player) 202, which includes a shared control board that provides read and write access to a subset of the multiple different storage magazines and/or cartridges by removably coupling to and from select storage magazines and/or cartridges to execute host-initiated read and write commands. The storage magazines and cartridges are shown arranged on a common rack 228, but may in other implementations be arranged in one or more drawer(s), shelves, groupings of racks, etc. The storage cartridges depicted in FIG. 2 are connected to the shared controller 202 in the form of magazines (e.g., magazine 204). More specifically, cartridges 208, 222, 224, 226 fill magazine 204, and magazine 204, as well as additional similar or dissimilar magazines, are selectively connected to the shared controller 202.

The secure cartridge-based storage system 200 includes one or more shared controllers (e.g., the shared controller 202, also referred to herein as a media player). The shared controller 202 includes a shared control board implemented on a printed circuit board assembly (PCBA) that incorporates various controls for providing selective data access to individual data magazines and/or cartridges. The shared controller 202 also controls partitioning user data and writing the partitioned data according to an information-theoretic security scheme, and reading the partitioned data and reconstructing the user data from the partitioned data.

The shared controller 202 moves across a range of rack positions to provide data access to a subset of the storage magazines and/or cartridges within the rack 228 (e.g., a specific magazine of storage cartridges). For example, the shared controller 202 may include actuation electronics to self-ambulate up and down relative to a column of storage cartridges or magazines (e.g., between rack walls 230, 232) and/or to move left and right relative to a row of storage cartridges or magazines. The depicted and described arrangement and size of the rack 228, as well as the example movements of the shared controller 202 discussed herein is intended to be as example only as such characteristics may vary widely from one implementation to another.

The shared controller 202 includes read/write (R/W) control circuitry 234, player actuation control circuitry 236, data partitioning circuitry 238, and data reconstruction circuitry 240, each of which are intended to represent a collection of hardware and software elements, including for example control instructions executed by one or more separate or shared device controllers (e.g., microprocessors), peripheral interface controllers ("PICs"), application-specific integrated circuits ("ASICs"), systems on chips ("SoCs"), etc.

The R/W control circuitry 234 executes read and write commands from a system host 246 on the various storage cartridges within the rack 228. For example, the R/W control circuitry 234 may perform actions that effectively engage switches to open appropriate read/write channels, select a preamplifier and configure preamplifier settings for read/write operations, control actuator movement for positioning various read/write heads of a select storage cartridge, spin up or down a spindle motor within a storage cartridge, controllably actuate a voice coil motor (VCM) within a storage cartridge, and/or control other electronics that facilitate power and data access (e.g., read/write access) to the storage cartridges.

The player actuation control circuitry 236 selectively controls actuation robotics to affect movements of the shared controller 202 relative to the rack 228, such as to position the shared controller 202 for data access to different storage magazines and/or cartridges within the rack 228.

The data partitioning circuitry 238 includes functional sub-units, such as a file partitioner. The file partitioner may query the storage magazines and/or cartridges within the rack 228 to determine storage availability. If the magazine 204 meets storage availability requirements for a write operation, the file partitioner selects the magazine 204 and creates a storage configuration definition for data to be written to the storage cartridges 208, 222, 224, 226 of the magazine 204. A key generator sub-unit generates a key set for the data and a key combiner sub-unit linearly combines one or more of the generated keys into linear coded keys. A packet generation sub-unit uses the definition and the linear coded keys to generate and store the data as a series of packets that are distributed across the storage cartridges 208, 222, 224, 226 of the magazine 204.

A similar set of units/sub-units referred to herein as a data reconstruction circuitry 240 may be used to read the data from the magazine 204 using the shared controller 202.

Based on the definition, the data reconstruction circuitry 240 reads the encrypted partitions/packets from the storage cartridges 208, 222, 224, 226, unencrypts the partitions/packets, and reassembles the data in an unencrypted state.

Although not shown, the shared controller 202 may further include circuitry for communicating with the host device 246 (e.g., a rack-based controller or facility server) as well as power controls for selectively powering up and down each of the individual magazines/cartridges when selectively coupled to such magazines/cartridges. In some implementations, each of multiple shared controllers may be adapted to selectively couple with and/or provide parallel data access to multiple storage magazines/cartridges within the rack 228 at once.

Figure 3:
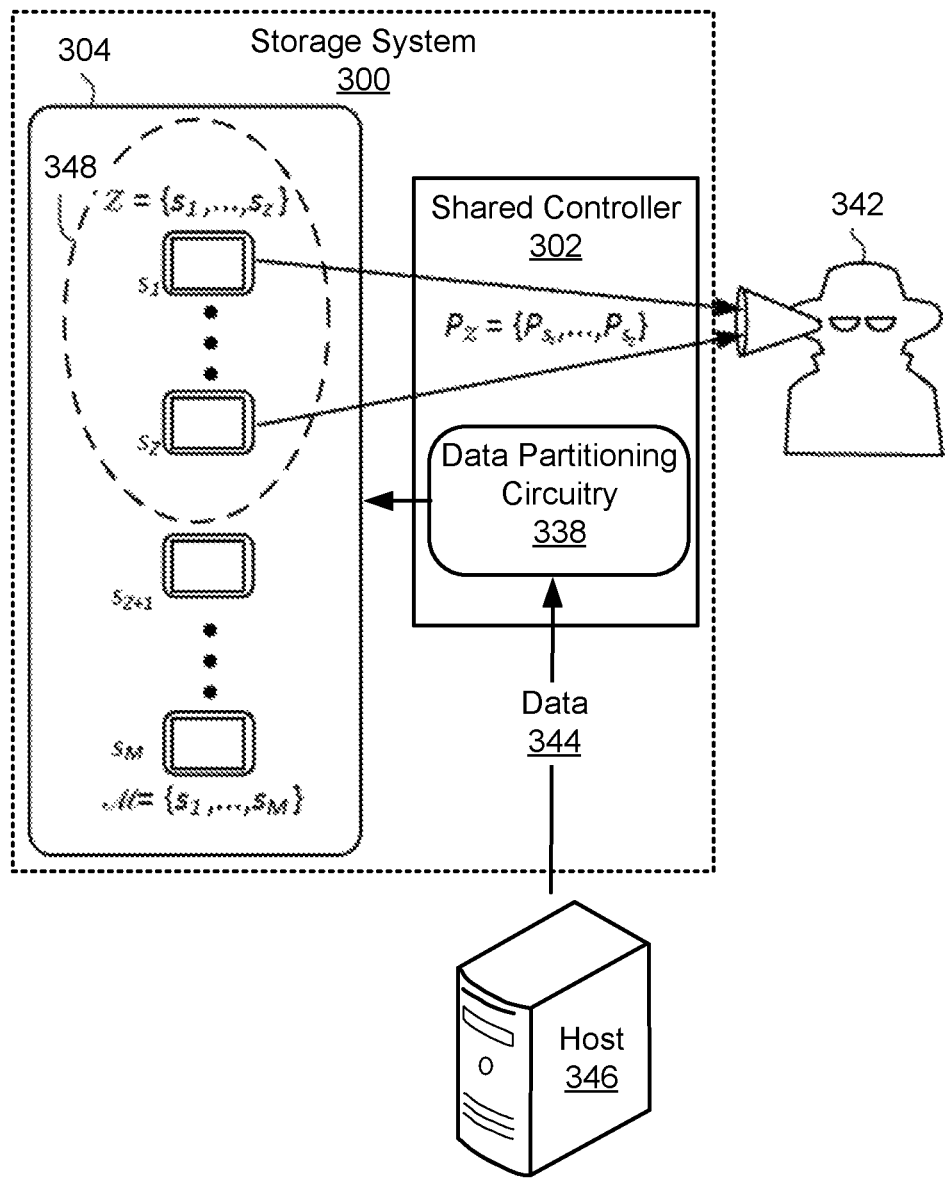
FIG. 3 illustrates an example cartridge data storage system with information-theoretic security having homogeneous cartridges.

FIG. 3 illustrates an example cartridge-based data storage system 300 including a magazine 304 with information-theoretic security having homogeneous cartridges. An end user may desire to store data 344 (e.g., a File F) within the system 300 via a network connected computer device (or host) 346. The data 344 is divided into partitions using data partitioning circuitry 338 within a shared controller 302, and each partition is stored in an available cartridge within the magazine 304.

In various attacks on the storage system 300, some of the cartridges within the magazine 304, but not all, may become compromised. More specifically, in an eavesdropping attack, an adversary 342 (also referred to herein as an attacker or eavesdropper) has access to a grouping or subset 348 of the cartridges (here, any Z=2 cartridges) and spies on the data stored therein. The goal of the information-theoretic security scheme is to keep the data confidential, even when a number of the cartridges are compromised by the adversary 342.

In the depicted example, the subset 348 of the data storage cartridges ($s_1 \ldots, s_z$) can be accessed by the adversary 342 such that the adversary 342 can view the data stored therein. The value Z signifies the maximum number of data storage cartridges to which the adversary 342 has access. The system 300 is designed such that the adversary 342 cannot read any partial information of the data 344 with access to only Z cartridges. An authorized user will have access to more than Z of the cartridges and therefore can read the data 344. In some implementations, the authorized user will need access to all of the cartridges to read the data 344.

Secret sharing schemes using linear coded keys may be used to address eavesdropping attacks, where data is divided into shares with equal sizes and each share is masked with linear coded keys and stored in one of the available cartridges. For instance, if there are M=5 available homogeneous storage cartridges (M={$s_1, s_2, s_3, s_4, s_5$}), to protect data from the adversary having access to at most Z=2 cartridges, file F is divided into three equal shares ($f_1, f_2,$ and $f_3$), and random keys ($k_1$ and $k_2$) are generated. The random keys ($k_1$ and $k_2$) are each of the same size as the file partitions ($f_1, f_2,$ and $f_3$) and are stored in two of the cartridges. For the remaining three cartridges, the file partitions are masked with independent linear combinations of the generated keys.

Accordingly, five packets are created that may be represented as: $P_{s_1}=k_1$, $P_{s_2}=k_2$, $P_{s_3}=f_1+k_1+k_2$, and $P_{s_4}=f_2+k_1+2k_2$, and $P_5=f_3+k_1+3k_2$. Each packet is stored in one of the five storage nodes of $s_1, s_2, s_3, s_4,$ and $s_5$. In various implementations, the values of the packets are arithmetically combined as indicated but truncated to fit in the packets. This system setup keeps all three shares $f_1, f_2,$ and $f_3$ confidential from any Z=2 storage cartridges that might be under an eavesdropping attack. The foregoing combinations of shares and keys stored on each of the storage cartridges is an example only. Any other combinations of shares and keys are contemplated herein such that the File F cannot be reconstructed from any Z=2 storage cartridges.

The storage cartridges (M={$s_1, s_2, s_3, s_4, s_5$}) of FIG. 3 are homogeneous in terms of available storage capacity for receiving the equal shares $f_1, f_2,$ and $f_3$, and keys $k_1$ and $k_2$. While the available storage capacity is homogeneous, the storage cartridges (M={$s_1, s_2, s_3, s_4, s_5$}) of FIG. 3 may be homogeneous or heterogeneous in terms of overall storage capacity and/or storage technology (e.g., HDD, SSD, etc.). Other collections of storage cartridges within a magazine may be heterogeneous in terms of available and utilized storage capacity, an example of which is described in further detail below with reference to FIG. 4. Further, a similar information-theoretic security scheme may be used to store the data 344 across a number of data storage magazines. Such a system is designed such that the adversary 342 cannot read any partial information of the data 344 with access to only Z magazines. The goal remains to keep the data confidential, even when a number of the magazines are compromised by the adversary 342.

Figure 4:
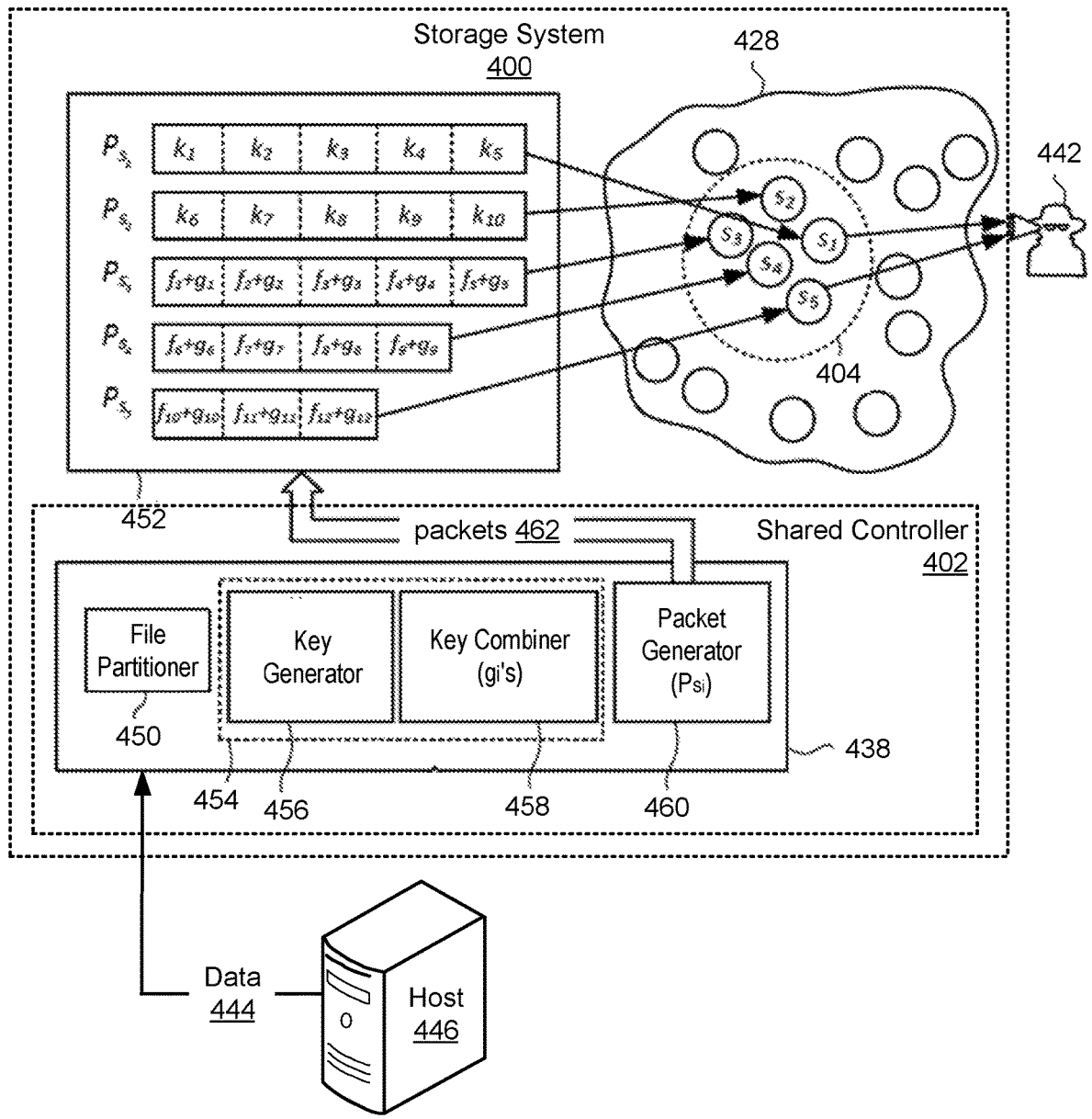
FIG. 4 illustrates an example cartridge data storage system with information-theoretic security having heterogeneous cartridges.

FIG. 4 illustrates an example cartridge-based data storage system 400 including a rack 428 of magazines (e.g., magazine 404) with information-theoretic security having heterogeneous cartridges. An end user may desire to store data 444 (e.g., a File F) within the system 400 via a network connected computer device (or host) 446. The data 444 is divided into partitions using data partitioning circuitry 438 within a shared controller 402 for at least magazine 404, and each partition is stored in an available cartridge within the magazine 404.

For heterogeneous cartridges where the storage size of cartridges within the magazine are different, File F can be divided into parts with equal sizes and masked with linear combinations of random keys as discussed above. Then, based on the storage size of each cartridge, a different number of file parts may be stored in different cartridges. In some implementations, the number of cartridges used to store the data may be optimized based on minimizing cost (e.g., in an implementation where the File F is divided and stored on a number of cartridges spread across multiple magazines). In other implementations, the number of cartridges within a magazine is fixed and the cartridges are selected such that the data can be stored among the selected cartridges while the privacy constrains are satisfied (e.g., in an implementation where the File F is distributed across all cartridges within a singular magazine (e.g., magazine 404)).

In various implementations, the shared controller 402 may include conventional computing hardware such as processors, memory, input/output busses, etc., as well as specialized hardware, e.g., application-specific integrated circuits, digital signal processors, etc. The shared controller 402 includes functional units (e.g., software modules, logic circuits) such as the data partitioning circuitry 438, which in turn includes functional sub-units, such as a file partitioner 450. The file partitioner 450 may query various magazines within the rack 428 to determine storage availability of the magazines and the individual cartridges therein. Based on the determined availability, the file partitioner 450 selects the magazine 404 and creates a storage configuration definition 452 for the data 444. This definition 452 includes identification of the selected magazine 404, the partition/packet size to be stored on each cartridge therein, an arrangement of data and keys for each partition, etc.

A key generation sub-unit 454 includes a key generator 456 that generates a key set for the data 444 and a key combiner 458 that linearly combines the keys of the set into linear coded keys, $g_i$'s. The key generator 456 generates a unique key set for each incoming file to be written to the magazine 404, and for each time the incoming file is to be written to the magazine 404. A packet generation sub-unit 460 uses the definition 452 and the linear coded keys to generate and store the data 444 within the magazine 404 as a series of packets 462. A similar set of modules and sub-modules referred to herein as a data reconstruction circuitry (not shown, see e.g., data reconstruction circuitry 240 of FIG. 2) may be used to read the data 444 from the magazine 404 using the shared controller 402. Based on the definition 452, the data reconstruction circuitry reads the encrypted partitions/packets, unencrypts the partitions/packets, and reassembles the data 444 in an unencrypted state.

Application of the secret sharing scheme described above with reference to FIG. 3 does not take into account any heterogeneity of the cartridges within the magazine 304. In contrast, if each of five cartridges (e.g., $s_1$, $s_2$, $s_3$, $s_4$, and $s_5$) within the magazine 404 has a different allocated storage availability, then the stored packets 462 (e.g., $P_{s_1}$, $P_{s_2}$, $P_{s_3}$, $P_{s_4}$, and $P_{s_5}$) may have different sizes, which as a side benefit can improve overall robustness of the secret sharing scheme. For purposes of this disclosure, the term "storage availability" is used to describe the capability of a cartridge to fulfill a request that meets a minimum requirement. For example, the cartridge will not only have the available capacity to store the data but will have read/write performance that satisfies a minimum standard defined for the data 444.

As discussed above, each packet of packets 462 is created using the file partitions and the generated keys. The file partitioner 450 uses the available heterogeneous cartridges within the rack 428 efficiently such that the data 444 is secure against an eavesdropper adversary 442 attacking at most Z cartridges. In one example, the magazine 404 has a sufficient number of available cartridges and is selected to be used for securely storing data 444. There are $M=\{s_1, s_2, \ldots, s_M\}$ available heterogeneous cartridges within the magazine 404.

The set of selected cartridges is denoted by $N=\{s_1, s_2, \ldots, s_N\}$, where $N \leq M$. Then, the set of packets $P_N = \{P_{s_i}, s_i \in N\}$ is created to be stored in the magazine 404, where $P_{s_i}$ is stored at storage $s_i \in N$. The capability of the adversary 442 is characterized in terms of parameter $Z<N$. More specifically, the adversary 442 may have access to data stored in at most Z cartridges. However, as the packets stored on each cartridge is encrypted and other packets stored on other cartridges are required to decrypt the data 444, the definition 452 is used to make the data 444 confidential from any Z storage nodes.

The value of Z is a security parameter, where higher values of Z provides more security to the data 444 and smaller values of Z makes the data 444 more vulnerable to an attack. However, a more robust system 400 with larger values of Z comes with the cost of an increase in the storage usage (increase in the number of cartridges required to store the data 444) and an increase in the complexity of designing the secure system 400. Parameter Z may be considered a tradeoff between providing increased security at the cost of increased complexity of system 400. Choosing Z may take into account the sensitivity of the data 444 and vulnerability of the system 400 to an attack. The definition 452 is generally chosen such that the adversary 442 cannot get any meaningful information about the data 444 so long as $Z<N$. The definition 452 is further selected to minimize computational complexity at the design stage of the system 400, as well as reducing computational complexity and communication cost for an authorized user at the stage of retrieving the data 444.

The definition 452 divides the data 444 into shares with equal sizes ($f_i$) and each share is masked with linear coded keys ($g_i$) which are generated as linear combinations of the generated keys ($k_i$). Each of the resulting packets 462 is stored in one of the available cartridges. For instance, if there are $M=5$ available heterogeneous storage cartridges ($M=\{s_1, s_2, s_3, s_4, s_5\}$), data 444 is first divided into twelve equal shares ($f_1, f_2, \ldots, f_{12}$), and ten keys ($k_1, k_2, \ldots, k_{10}$) are generated. Twelve linear combinations of the generated keys ($g_1, g_2, \ldots, g_{12}$) are also generated.

Then, five packets of: $P_{s_1}=\{k_1, k_2, k_3, k_4, k_5\}$; $P_{s_2}=\{k_6, k_7, k_8, k_9, k_{10}\}$; $P_{s_3}=\{(f_1 g_1), (f_2+g_2), (f_3+g_3), (f_4+g_4), (f_5+g_5)\}$; $P_{s_4}=\{(f_6+g_6), (f_7+g_7), (f_8+g_8), (f_9+g_9)\}$; and $P_{s_5}=\{(f_{10}+g_{10}), (f_{11}+g_{11}), (f_{12}+g_{12})\}$ are created and each packet is stored in one of the five storage nodes of $s_1$, $s_2$, $s_3$, $s_4$, and $s_5$. The different parts of each packet are concatenated to generate the packet. Available capacity within the cartridges may be taken into account when selecting the size of data shares ($f_1$) and the overall packets ($P_{s_j}$). The foregoing combinations of shares ($f_i$), keys ($k_i$), and linear combinations of the generated keys ($g_i$) stored on each of the storage cartridges is an example only. Any other combinations of shares with equal and/or unequal sizes ($f_i$), linear coded keys ($k_i$), and linear combinations of the generated keys ($g_i$) are contemplated herein such that the data 444 cannot be reconstructed from any $Z=2$ storage cartridges. Further, a similar information-theoretic security scheme may be used to store the data 444 across a number of data storage magazines within the rack 428, on multiple racks within a data storage facility, or across multiple data storage facilities. Such a system is designed such that the adversary 442 cannot read any partial information of the data 444 with access to only Z magazines. The goal remains to keep the data confidential, even when a number of the magazines are compromised by the adversary 442.

Figure 5:
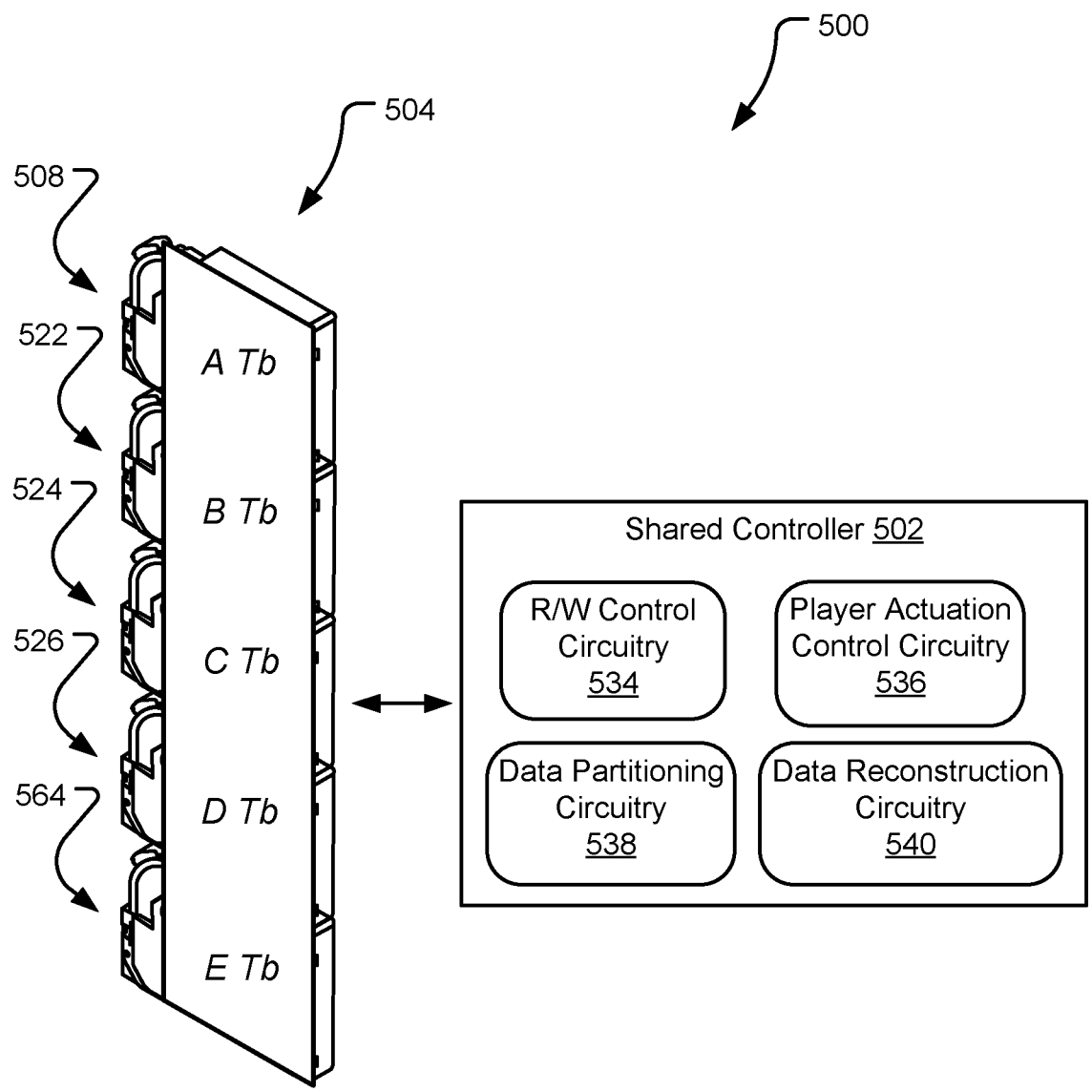
FIG. 5 illustrates an example shared controller for a magazine of storage cartridges within a secure cartridge-based storage system.

FIG. 5 illustrates an example shared controller 502 for a magazine 504 of storage cartridges 508, 522, 524, 526, 564 within a secure cartridge-based storage system 500. Each of the storage cartridges 508, 522, 524, 526, 564 has a primary non-volatile memory with data storage using an information-theoretic security scheme but lacks independent read/write control electronics. The shared controller (or media player) 502, which includes a shared control board, provides read and write access to each of the storage cartridges 508, 522, 524, 526, 564 within the magazine 504 by removably coupling to and from the magazine 504 and/or storage cartridges 508, 522, 524, 526, 564 therein to execute host-initiated read and write commands.

The shared controller 502 includes functional units (e.g., software modules, logic circuits), such as read/write (R/W) control circuitry 534, player actuation control circuitry 536, data partitioning circuitry 538, and data reconstruction circuitry 540, each of which is intended to represent a collection of hardware and software elements, including for example control instructions executed by one or more separate or shared device controllers, PICs, ASICs, SoCs, etc. The R/W control circuitry 534 executes read and write commands from a system host (not shown, see e.g., system host 246 of FIG. 2) on the various storage cartridges 508, 522, 524, 526, 564 within the magazine 504. The player actuation control circuitry 536 selectively controls actuation robotics to affect movements of the shared controller 502 relative to the magazine 504 and/or an associated rack (not shown, see e.g., rack 228 of FIG. 2), in order to position the shared controller 502 for data access to the magazine 504 and/or the storage cartridges 508, 522, 524, 526, 564.

The data partitioning circuitry 538 includes functional sub-units, such as a file partitioner. The file partitioner may query the magazine 504 to determine storage availability of the storage cartridges 508, 522, 524, 526, 564. If the magazine 504 meets storage availability requirements for a write operation, the file partitioner selects the magazine 504 and creates a storage configuration definition for data to be written to the magazine 504. A key generator sub-unit generates a key set for the data and a key combiner sub-unit linearly combines one or more of the generated keys into linear coded keys. A packet generation sub-unit uses the definition and the linear coded keys to generate and store the data as a series of packets that are distributed across the storage cartridges 508, 522, 524, 526, 564 of the magazine 504.

A similar set of units/sub-units referred to herein as a data reconstruction circuitry 540 may be used to read the data from the magazine 504 using the shared controller 502. Based on the definition, the data reconstruction circuitry 540 reads the encrypted partitions/packets from the storage cartridges 508, 522, 524, 526, 564, unencrypts the partitions/packets, and reassembles the data in an unencrypted state. Although not shown, the shared controller 502 may further include circuitry for communicating with the system host, as well as power controls for selectively powering up and down the magazine 504 when selectively coupled to the magazine 504.

In various implementations, the storage cartridges 508, 522, 524, 526, 564 of the magazine 504 may be homogeneous, partially homogeneous, or heterogeneous. In a homogeneous implementation, the available storage capacities of each of the storage cartridges 508, 522, 524, 526, 564 are substantially equal (e.g., A=B=C=D=E terabytes (Tb)). Substantially equal within the meaning of the present disclosure means less than a 1% variation in available storage capacities between the storage cartridges 508, 522, 524, 526, 564 (e.g., each of the cartridges 508, 522, 524, 526, 564 are rated as 20 Tb cartridges). In an implementation of the presently disclosed technology where file partitions are distributed within a homogeneous array of the storage cartridges 508, 522, 524, 526, 564, the system 500 may utilize a homogenous information-theoretic security scheme, such as that discussed above in detail with reference to FIG. 3.

In a heterogeneous implementation, the available storage capacities of each of the storage cartridges 508, 522, 524, 526, 564 are substantially unequal (e.g., A≠B≠C≠D≠E terabytes (Tb)). Substantially unequal within the meaning of the present disclosure means greater than a 1% variation in available storage capacities between the storage cartridges 508, 522, 524, 526, 564 (e.g., A=22 Tb, B=21 Tb, C=20 Tb, D=16 Tb, E=12 Tb). In an implementation where file partitions are distributed within a heterogeneous array of the storage cartridges 508, 522, 524, 526, 564, the system 500 may utilize a heterogeneous information-theoretic security scheme, where file partitions sizes vary according to the available storage capacities within the storage cartridges 508, 522, 524, 526, 564, such as that discussed above in detail with reference to FIG. 4. Further, if desired, the system 500 may utilize a homogenous information-theoretic security scheme with a heterogeneous array of the storage cartridges 508, 522, 524, 526, 564 by selecting the smallest available storage capacity amongst the storage cartridges 508, 522, 524, 526, 564 for the file partitions (e.g., a homogeneous information-theoretic security scheme with file partition sizes of 12 Tb, assuming E=12 Tb and is the smallest available storage capacity amongst the storage cartridges 508, 522, 524, 526, 564).

In a partially homogeneous implementation, some of the available storage capacities of each of the storage cartridges 508, 522, 524, 526, 564 are substantially equal (e.g., A=B=C terabytes (Tb)), while others are not (e.g., C≠D≠E terabytes (Tb)). The secure cartridge-based storage system 500 may not distinguish between heterogeneous and partially homogeneous implementations.

Figure 6:
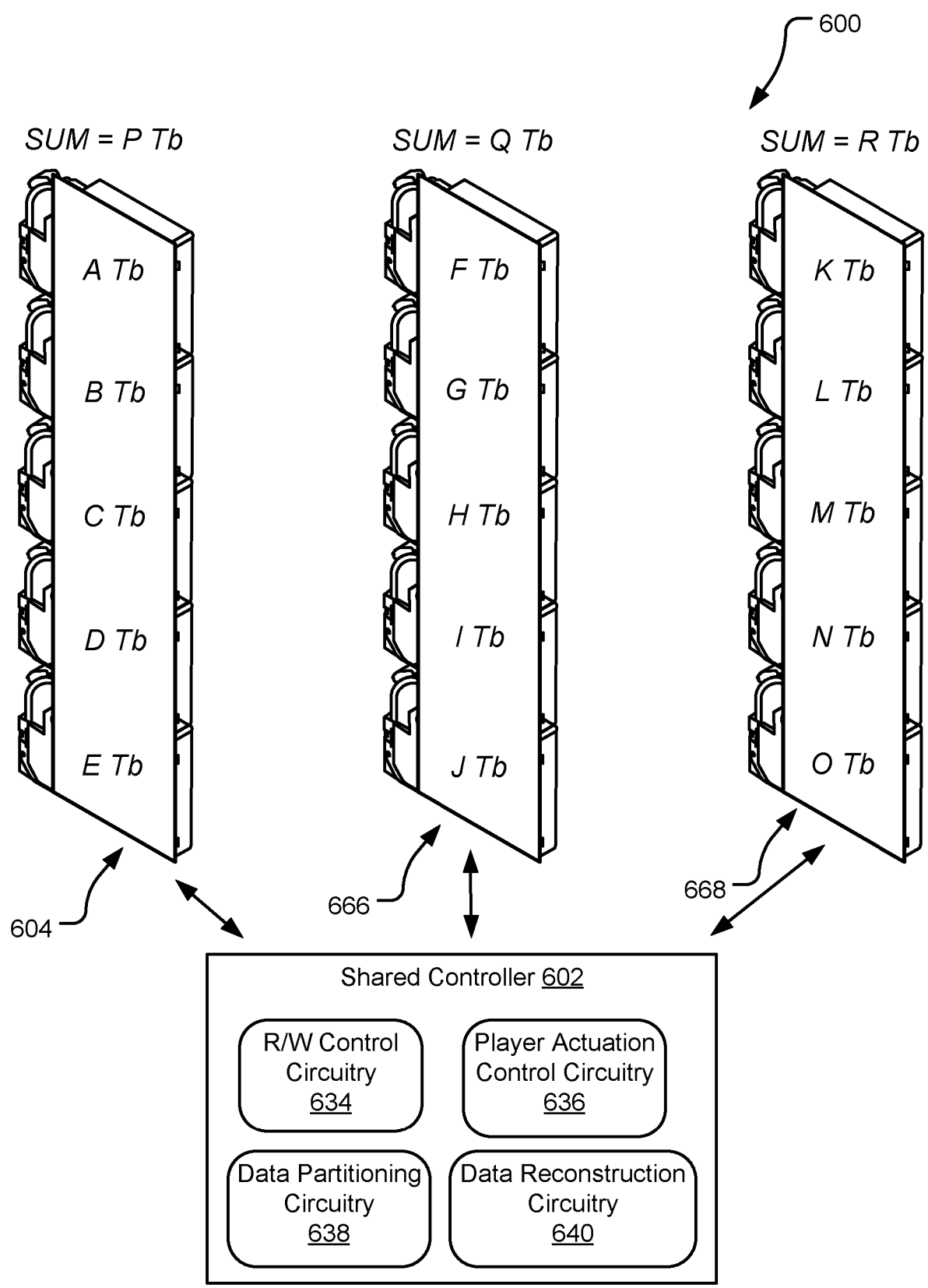
FIG. 6 illustrates an example shared controller for an array of magazines of storage cartridges within a secure cartridge-based storage system.

FIG. 6 illustrates an example shared controller 602 for an array of magazines 604, 666, 668 of storage cartridges within a secure cartridge-based storage system 600. Each of the magazines 604, 666, 668 include any array of storage cartridges that have a primary non-volatile memory and store data with information-theoretic security but lack independent read/write control electronics. The shared controller (or media player) 602, which includes a shared control board provides read and write access to each of the storage cartridges within each of the magazines 604, 666, 668 by removably coupling to and from the magazines 604, 666, 668 and associated storage cartridges to execute host-initiated read and write commands.

The shared controller 602 includes functional units (e.g., software modules, logic circuits), such as read/write (R/W) control circuitry 634, player actuation control circuitry 636, data partitioning circuitry 638, and data reconstruction circuitry 640, each of which are intended to represent a collection of hardware and software elements, including for example control instructions executed by one or more separate or shared device controllers, PICs, ASICs, SoCs, etc. The R/W control circuitry 634 executes read and write commands from a system host (not shown, see e.g., system host 246 of FIG. 2) on the various storage cartridges within the magazines 604, 666, 668. The player actuation control circuitry 636 selectively controls actuation robotics to affect movements of the shared controller 602 relative to the magazines 604, 666, 668 and/or an associated rack (not shown, see e.g., rack 228 of FIG. 2), in order to position the shared controller 602 for data access to the magazines 604, 666, 668 and associated storage cartridges.

The data partitioning circuitry 638 includes functional sub-units, such as a file partitioner. The file partitioner may query the magazines 604, 666, 668 to determine storage availability of the storage cartridges therein. If one or more of the magazines 604, 666, 668 meet storage availability requirements for a write operation, the file partitioner selects the magazine(s) and creates a storage configuration definition for data to be written to the magazine(s). A key generator sub-unit generates a key set for the data and a key combiner sub-unit linearly combines one or more of the generated keys into linear coded keys. A packet generation sub-unit uses the definition and the linear coded keys to generate and store the data as a series of packets that are distributed across the storage cartridges within the selected magazine(s).

A similar set of units/sub-units referred to herein as a data reconstruction circuitry 640 may be used to read the data from the magazines 604, 666, 668 using the shared controller 602. Based on the definition, the data reconstruction circuitry 640 reads the encrypted partitions/packets from the storage cartridges, unencrypts the partitions/packets, and reassembles the data in an unencrypted state. Although not shown, the shared controller 602 may further include circuitry for communicating with the system host, as well as power controls for selectively powering up and down the magazines 604, 666, 668 when selectively coupled to the magazines 604, 666, 668.

As discussed above, each of the magazines 604, 666, 668 includes an array of storage cartridges (here, illustrated as five cartridges for each of the magazines 604, 666, 668). Each of the cartridges has an available storage capacity, illustrated herein as A Tb . . . O Tb. A sum of each of the magazines 604, 666, 668 is provided as: {P Tb=A Tb+B Tb+C Tb+D Tb+E Tb} for magazine 604, {Q Tb=F Tb+G Tb+H Tb+I Tb+J Tb} for magazine 666, and {R Tb=K Tb+L Tb+M Tb+N Tb+O Tb} for magazine 668}. In various implementations, the storage capacities of the cartridges within each of the magazines 604, 666, 668 may be homogeneous, partially homogeneous, or heterogeneous, as discussed above in detail with reference to FIG. 5. The information-theoretic security scheme may vary accordingly for a write operation to be executed within one of the homogeneous or heterogeneous magazines 604, 666, 668. Other write operations, however, may be distributed across two or more of the magazines 604, 666, 668, as discussed in further detail below.

In an example implementation, the file partitions and the generated keys are stored collectively in consecutive magazines 604, 666, 668. As the shared controller 602 has access to all of the magazines 604, 666, 668, the shared controller 602 can fully retrieve the data stored in the magazines 604, 666, 668, while if it has access to less than a threshold Z number of the magazines 604, 666, 668, it cannot get any knowledge about the data stored within any of the magazines 604, 666, 668. Accordingly, the data is information-theoretic security secure.

In various implementations, the magazines 604, 666, 668 may be homogeneous, partially homogeneous, or heterogeneous. In a homogeneous implementation, the available storage capacities of each of the magazines 604, 666, 668 are substantially equal (e.g., P=Q=R Tb). Substantially equal within the meaning of the present disclosure means less than a 1% variation in available storage capacities between the magazines 604, 666, 668 (e.g., each of the magazines 604, 666, 668 are rated as a 100 Tb magazine). In an implementation of the presently disclosed technology where file partitions are distributed within a homogeneous array of the magazines 604, 666, 668, the system 600 may utilize a homogenous information-theoretic security scheme, such as that discussed above in detail with reference to FIG. 3. Further, data storage distribution across the magazines 604, 666, 668 may utilize a cost minimization function, as further discussed in detail below. Still further, the system 600 may utilize a homogenous information-theoretic security scheme that distributes data across homogeneous magazines or homogeneous cartridges within a singular magazine (see e.g., FIG. 5). Distribution across homogeneous magazines may require a formula for selecting a subset of magazines among all available magazines. Distribution across homogeneous cartridges may merely use all the cartridges within the magazine.

In a heterogeneous implementation, the available storage capacities of each of the magazines 604, 666, 668 are substantially unequal (e.g., P≠Q≠R Tb). Substantially unequal within the meaning of the present disclosure means greater than a 1% variation in available storage capacities between the magazines 604, 666, 668 (e.g., P=100 Tb, Q=102 Tb, R=95 Tb). In an implementation where file partitions are distributed within a heterogeneous array of the magazines 604, 666, 668, the system 600 may utilize a heterogeneous information-theoretic security scheme, where file partitions sizes vary according to the available storage capacities within the magazines 604, 666, 668, such as that discussed above in detail with reference to FIG. 4. Further, data storage distribution across the magazines 604, 666, 668 may utilize a cost minimization function, as further discussed in detail below. Still further, if desired, the system 600 may utilize a homogenous information-theoretic security scheme with a heterogeneous array of the magazines 604, 666, 668 by selecting the smallest available storage capacity amongst the magazines 604, 666, 668 for the file partitions (e.g., a homogeneous system with file partition sizes of 95 Tb, assuming R=95 Tb and that is the smallest available storage capacity amongst the storage magazines 604, 666, 668). Distribution across heterogeneous magazines may require a formula for selecting a subset of magazines among all available magazines. Distribution across heterogeneous cartridges may merely use all the cartridges within the magazine.

In a partially homogeneous implementation, some of the available storage capacities of the magazines 604, 666, 668 are substantially equal (e.g., P=Q Tb), while others are not (e.g., Q≠R Tb). The secure cartridge-based storage system 600 may not distinguish between heterogeneous and partially homogeneous implementations.

A cost for the shared controller 602 to read all shares and extract stored data includes two parts. First, there is a cost associated with getting access to each of the magazines 604, 666, 668. Assuming that the shared controller 602 moves among the consecutive magazines 604, 666, 668 one by one, the cost is equal to $NC_T$, where N is the total number of magazines (here, N=3) and $C_T$ is the cost of moving the player between two consecutive magazines (we assume that the cost for having access to the first magazine is also $C_T$). Second, there is a cost associated with reading data from all cartridges in all magazines. This cost is proportional to the size of the keys and the file partitions masked with keys, e.g., $(Z|P_{s_{Z+1}}|+|F|)C_d$, where $C_d$ is a cost for reading one piece of information, Z is a threshold parameter of the secret sharing scheme, $|P_{s_{Z+1}}|$ is the size of a $(Z+1)^{st}$ magazine when magazines are ordered from the largest storage size (where the storage size of a magazine is the summation of storage sizes among all cartridges of that magazine) to the smallest storage size, and F is the size of data to be stored. The foregoing costs associated with using magazines 604, 666, 668 to store the data may be combined to estimate an overall cost, which may be compared with a desired level of security to select a number of magazines that meet data security requirements, while minimizing overall cost.

For homogeneous magazines, the optimum number of magazines for storing the data is calculated using a cost minimization function. After determining the optimum number of magazines, the data partitioning circuitry 638 proceeds to partition and write the data to the selected magazines. For heterogeneous magazines, the optimum number of magazines is calculated heuristically. First, the optimum number of magazines is calculated for a homogeneous case, and then a decision between (i) adding one more magazine or (ii) using more storage from each magazine, is made based on the cost minimization function. The latter option (i.e., using more storage from each magazine) may be provided by either using more cartridges from each magazine or using more storage size from each cartridge of the magazine. After determining the optimum number of magazines, the data partitioning circuitry 638 proceeds to partition and write the data to the selected magazines.

Figure 7:
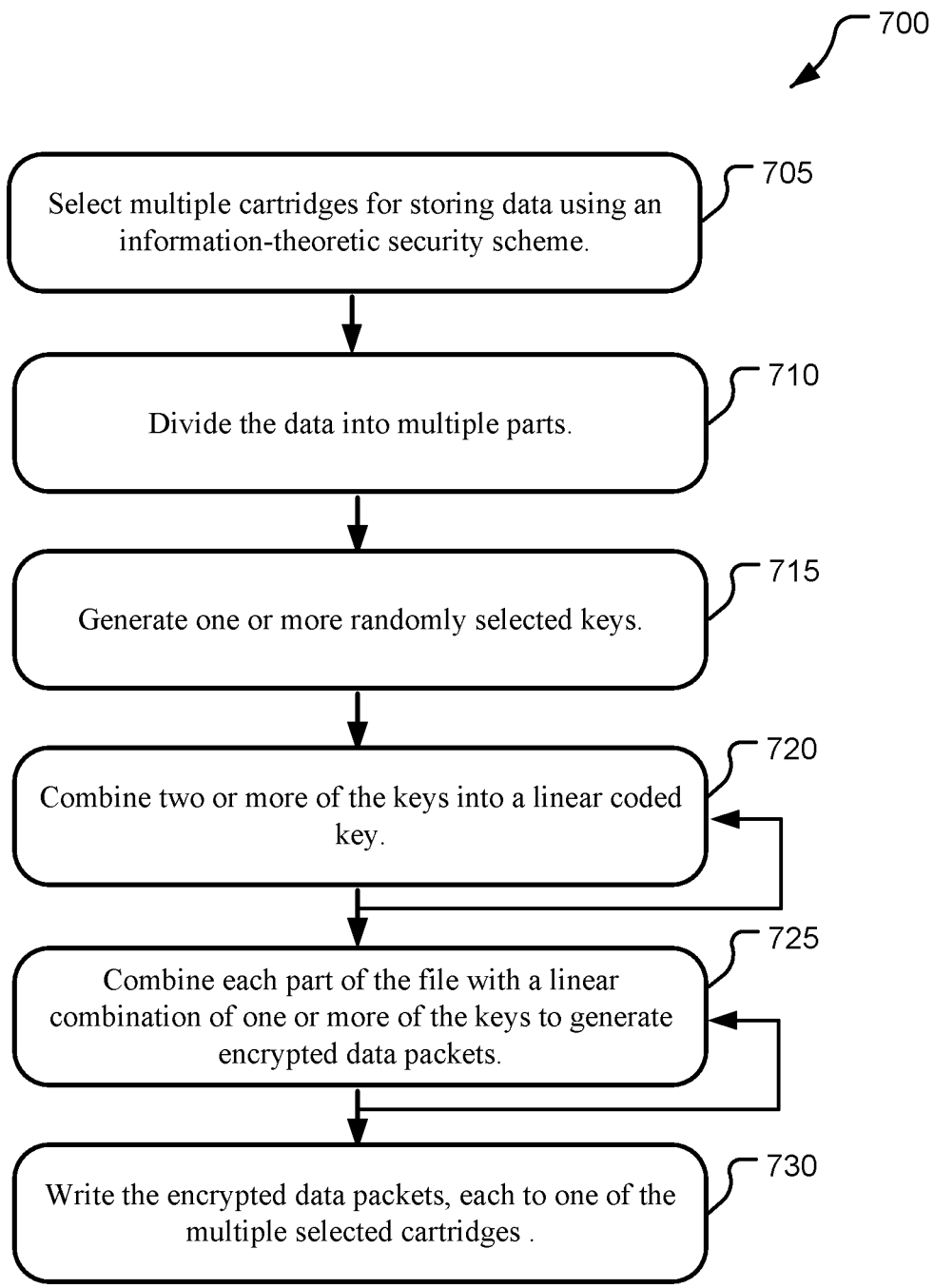
FIG. 7 illustrates example operations for storing data within a cartridge-based data storage system having information-theoretic security.

FIG. 7 illustrates example operations 700 for storing data within a cartridge-based data storage system having information-theoretic security. A selecting operation 705 selects multiple cartridges for storing data (e.g., a file F) using an information-theoretic security scheme. The multiple cartridges are selected as a subset of all candidate cartridges to distributedly store the data. In some implementations, the selecting operation 705 may instead apply to one or more magazines, rather than cartridges. In such implementations, all the cartridges within selected magazine(s) may be used for storing the data.

The selected cartridges/magazines satisfy a minimum requirement to provide a desired level of security to the data. The selected cartridges/magazines each lack an independent set of read/write control electronics and are adapted to selectively couple with a shared controller (or media player), which includes a control board supporting read/write control circuitry, player actuation control circuitry, data partitioning circuitry, and data reconstruction circuitry. The shared controller performs all actions related to data partitioning and subsequent reconstruction by an authorized party.

A dividing operation 710 divides the data into multiple parts or partitions. In various implementations, the dividing operation 710 is performed by a file partitioner running on the shared controller. A generating operation 715 generates one or more randomly selected keys. In various implementations, the generating operation 715 is performed by a key generator running on the shared controller. A key combining operation 720 combines two or more of the keys into a linear coded key. The key combining operation 720 may be repeated to generate multiple linear coded keys, in some implementations, one for each file part, as evidenced by a feedback arrow on FIG. 7. The linear coded keys may be used to mask file partitions. In various implementations, the key combining operation 720 is performed by a key combiner running on the shared controller.

A packet combining operation 725 combines each part of the file with a linear combination of one or more of the keys to generate encrypted data packets at the shared controller. The packet combining operation 725 may be repeated to generate multiple encrypted data packets, in some implementations, one for each selected cartridge, as evidenced by a feedback arrow on FIG. 7. In some implementations, the encrypted data packets may include the linear coded keys generated in operation 720. In various implementations, the combining operation 725 is performed by a packet generator running on the shared controller. A writing operation 730 writes the encrypted data packets, each to one of the multiple selected cartridges using the shared controller.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A cartridge data storage system with information-theoretic security comprising:
    a first cartridge storing a first encrypted data packet;
    a second cartridge storing a second encrypted data packet; and
    a shared controller providing read and write access to the first cartridge and the second cartridge, the shared controller having data partitioning circuitry including:
        a file partitioner to divide a file into a first part and a second part;
        a key generator to randomly generate one or more keys; and
        a packet generator to combine the first part of the file with a linear combination of one or more of the keys to generate the first encrypted data packet, the packet generator further to combine the second part of the file with another linear combination of one or more of the keys to generate the second encrypted data packet.

2. The cartridge data storage system with information-theoretic security of claim 1, wherein the first cartridge and the second cartridge reside in a magazine accessible by the shared controller.

3. The cartridge data storage system with information-theoretic security of claim 1, wherein the first cartridge and the second cartridge are homogeneous, and the first encrypted data packet and the second encrypted data packet are the same size.

4. The cartridge data storage system with information-theoretic security of claim 1, wherein the first cartridge and the second cartridge are heterogeneous, and the first encrypted data packet and the second encrypted data packet are differing sizes.

5. The cartridge data storage system with information-theoretic security of claim 1, wherein the shared controller further includes:
    a key combiner to linearly combine two or more of the keys into a first linear coded key, the key combiner further to linearly combine two or more of the keys into a different second linear coded key, wherein the packet generator is further to combine the first part of the file with the first linear coded key to generate the first encrypted data packet, and wherein the packet generator is further to combine the second part of the file with the second linear coded key to generate the second encrypted data packet.

6. The cartridge data storage system with information-theoretic security of claim 5, further comprising:
    a third cartridge storing a third encrypted data packet, wherein
        the file partitioner is further to divide the file into a third part;
        the key combiner is further to linearly combine one or more of the keys into a different third linear coded key; and
        the packet generator is further to combine the third part of the file with the third linear coded key to generate the third encrypted data packet.

7. The cartridge data storage system with information-theoretic security of claim 1, wherein access to a minimum number of cartridges is required to recover any portion of the file.

8. The cartridge data storage system with information-theoretic security of claim 1, wherein the shared controller further has data reconstruction circuitry to read the first and the second encrypted data packets from the first and the second cartridges, unencrypt the first and the second encrypted data packets, and reassemble the file in an unencrypted state.

9. The cartridge data storage system with information-theoretic security of claim 1, wherein each of the first cartridge and the second cartridge includes non-volatile memory and lacks an independent set of read/write controls.

10. A method for data storage within a cartridge data storage system with information-theoretic security comprising:
dividing a file into a first part and a second part at a shared controller;
generating one or more randomly-selected keys at the shared controller;
combining the first part of the file with a linear combination of one or more of the keys to generate a first encrypted data packet at the shared controller;
combining the second part of the file with another linear combination of one or more of the keys to generate a second encrypted data packet at the shared controller; and
writing the first encrypted data packet to a first cartridge and the second encrypted data packet to a second cartridge using the shared controller.

11. The method of claim 10, further comprising:
selecting a first cartridge and a second cartridge for storing the file, both cartridges accessible using the shared controller.

12. The method of claim 10, wherein the first cartridge and the second cartridge reside in a magazine accessible by the shared controller.

13. The method of claim 10, wherein the first cartridge and the second cartridge are homogeneous, and the first encrypted data packet and the second encrypted data packet are the same size.

14. The method of claim 10, wherein the first cartridge and the second cartridge are heterogeneous, and the first encrypted data packet and the second encrypted data packet are differing sizes.

15. The method of claim 10, further comprising:
linearly combining two or more of the keys into a first linear coded key;
linearly combining two or more of the keys into a different second linear coded key, wherein the first part of the file is combined with the first linear coded key to generate the first encrypted data packet, and wherein the second part of the file is combined with the second linear coded key to generate the second encrypted data packet.

16. A cartridge data storage system with information-theoretic security comprising:
a first magazine of cartridges storing a first grouping of encrypted data packets;
a second magazine of cartridges storing a second grouping of encrypted data packets; and
a shared controller providing read and write access to the cartridges within the first magazine and the second magazine, the shared controller having data partitioning circuitry including:
a file partitioner to divide a file into a first part and a second part;
a key generator to randomly generate one or more keys; and
a packet generator to combine the first part of the file with a linear combination of one or more of the keys to generate a first encrypted data packet within the first grouping, the packet generator further to combine the second part of the file with another linear combination of one or more of the keys to generate a second encrypted data packet within the second grouping.

17. The cartridge data storage system with information-theoretic security of claim 16, wherein the first magazine of cartridges and the second magazine of cartridges are homogeneous, and the first encrypted data packet and the second encrypted data packet are the same size.

18. The cartridge data storage system with information-theoretic security of claim 16, wherein the first magazine of cartridges and the second magazine of cartridges are heterogeneous, and the first encrypted data packet and the second encrypted data packet are differing sizes.

* * * * *